United States Patent [19]

Tanaka

[11] Patent Number: 4,634,046
[45] Date of Patent: Jan. 6, 1987

[54] CONTROL SYSTEM USING COMBINED CLOSED LOOP AND DUTY CYCLE CONTROL FUNCTIONS

[75] Inventor: Minoru Tanaka, Yamato, Japan

[73] Assignee: Yamatake-Honeywell Co. Limited, Tokyo, Japan

[21] Appl. No.: 726,191

[22] Filed: Apr. 22, 1985

[30] Foreign Application Priority Data

May 10, 1984 [JP] Japan .................................. 59-91839

[51] Int. Cl.⁴ .............................................. F23N 5/20
[52] U.S. Cl. .................... 236/46 F; 62/231
[58] Field of Search ................ 236/46 R, 46 F, 78 D; 62/231; 165/12 R, 26; 364/557

[56] References Cited

U.S. PATENT DOCUMENTS

3,443,121  5/1969  Weisbrod ...................... 236/46 F X
3,599,864  8/1971  Liddle .............................. 236/78 D
4,420,113 12/1983  Lacroix ............................ 236/46 F

Primary Examiner—William E. Wayner
Attorney, Agent, or Firm—Mitchell J. Halista; Trevor B. Joike

[57] ABSTRACT

A control system having combined closed loop and duty cycle functions uses a differential amplifier for amplifying the difference between a setpoint or reference temperature for a system to be controlled and a detected system temperature, a thermostat having a differential circuit for providing a predetermined hysteresis lag for an output of the amplifier and a duty cycle generating circuit for changing the operating potential of the differential circuit in accordance with a predetermined duty cycle to shift the operating point of the differential circuit.

4 Claims, 9 Drawing Figures

CONTROL SYSTEM USING COMBINED CLOSED LOOP AND DUTY CYCLE CONTROL FUNCTIONS

BACKGROUND OF THE INVENTION

1. Field of the Invention

The present invention relates to a control system wherein closed-loop control and duty cycle control are combined.

2. Description of the Prior Art

In the temperature control of a refrigerator system or the like, a closed-loop system employing a thermostat is of frequent use. That system provides ON/OFF control of the operation of a refrigerator system by means of a thermostat provided therein to control the temperature of the refrigerator system at a desired temperature. If the thermostat therein is provided with a larger value of differential, or a hysteresis lag in the ON/OFF operation, either the duration of the controlled temperature values, or the deviation of the temperature from a desired temperature, will become the larger. If, on the other hand, the differential is set at a smaller value to make the duration smaller, the ON/OFF operation will alternate so frequently that the refrigerator system is put under a severe operating condition. Thus, the setting of the differential is quite delicate and troublesome. Additionally, the ON/OFF control is executed regardless of the ambient temperature is spite of the fact that an ambient temperature change due to change of season or the like has an effect on the object of the control. Such being the case, that type of control has not been wholly satisfactory.

SUMMARY OF THE INVENTION

An object of the present invention is to provide an improved control system having combined closed loop and duty cycle control functions.

In accomplishing these and other objects, there has been provided, in accordance with the present invention, a control system wherein a closed-loop control is combined with a duty cycle control for compensating for the ambient temperature wherein the operating point of a differential setting circuit of a variable sensing and control element is determined by a comparator determining the duty factor of the duty cycle.

BRIEF DESCRIPTION OF THE DRAWINGS

A better understanding of the present invention may be had when the following description is read in connection with the accompanying drawings, in which:

FIG. 1 (a) is a block diagram showing a temperature control system of the prior art;

FIG. 1 (b) is a graph showing operation of the apparatus of FIG. 1 (a);

DESCRIPTION OF THE PREFERRED EMBODIMENT

Figure 1A:
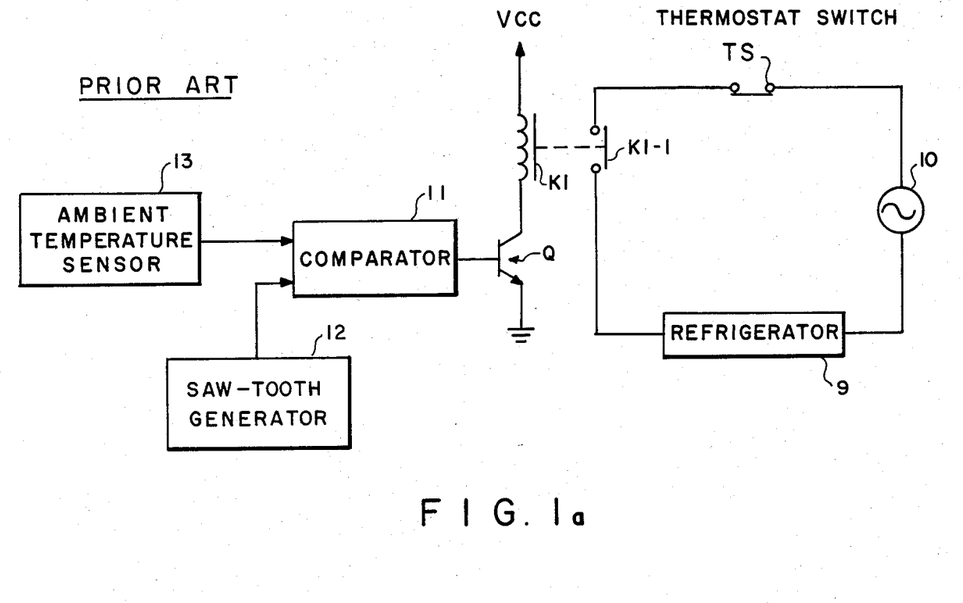
Figure 1B:
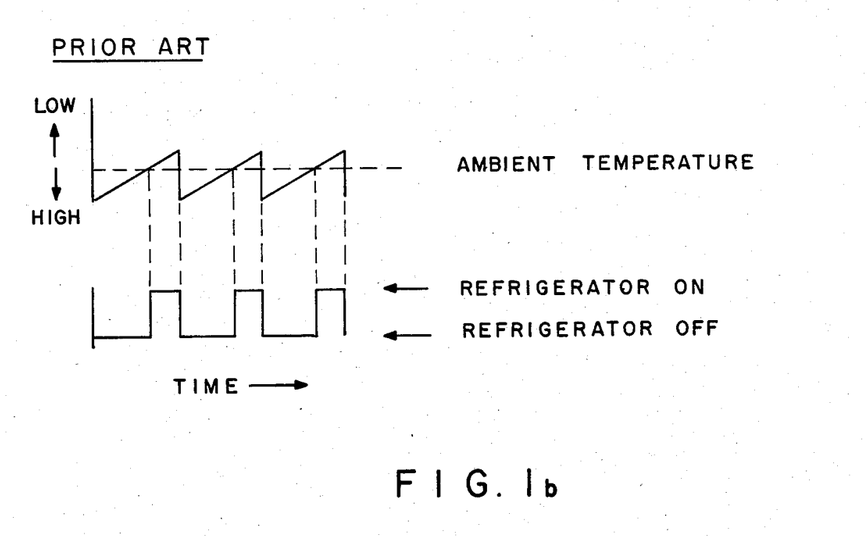

To overcome the aforesaid disadvantages of an ON/OFF control system, proposals have been made for combining such a thermostat control with a duty cycle control wherein a duty factor is determined according to the ambient temperature. An example of such a system of the prior art is shown in FIG. 1a, wherein as an environment variable control system, e.g., a refrigerator system including a refrigerator 9, is adapted to perform a cooling function. The refrigerator 9 is supplied with power from a power source 10 through a thermostat switch TS and a contact K1-1 of a relay K1 connected in series with the thermostat TS. A comparator 11 is adapted to compare a saw-tooth wave generated by a saw-tooth generator 12 with the ambient temperature value detected by an ambient temperature sensor 13 for determining the turning ON a transistor Q. Upon a turning ON of the transistor Q, the relay K1 is turned ON and the relay contact K1-1 is closed. More particularly, the refrigerator system provides a cooling operation when there is a request for cooling from the thermostat TS and the duty cycle depending on the ambient temperature is at a high duty cycle state. The comparator 11 can be set so that the relay K1 may be held ON longer if the ambient temperature is higher, and compensation for the ambient temperature can thereby be provided. Controlling characteristics can thus be improved and such an advantage is brought about that the differential need not be made very small. That control system, however, is an open-loop control system, and therefore a suitable duty factor should be provided therefor according to the ambient temperasture. If too large a duty factor is provided, for example, the system temperature will become too high.

Figure 2:
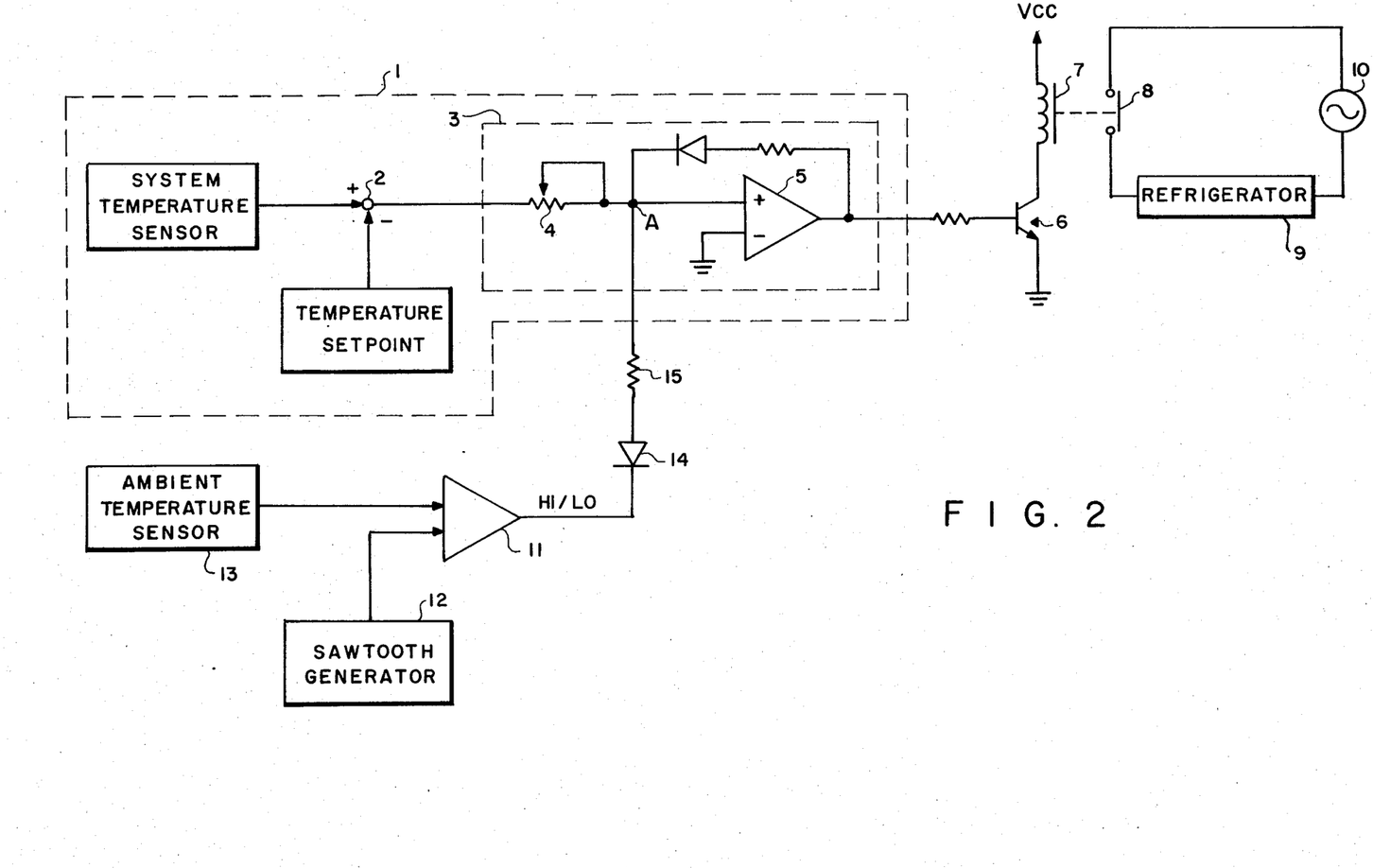
FIG. 2 is a block diagram showing a control system embodying an example of the present invention.
Figure 3:
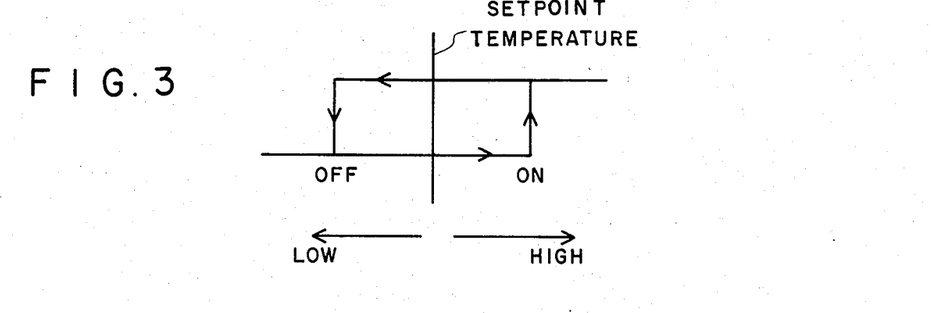
FIG. 3 is a graph showing the output characteristics of a differential amplifier used in the apparatus shown in FIG. 2.

A preferred embodiment of the present invention is shown in FIG. 2 having a thermostat 1 formed of a differential amplifier 2 and a differential circuit 3. The differential amplifier 2 responds to and amplifies the difference between a detected temperature value by a temperature sensor arranged to sense a system temperature and a preset or setpoint temperature value for the system. The differential circuit 3 includes an adjustable resistor 4 and a comparator 5 with its reference potential input at zero volts, i.e., ground. The differential circuit 3 introduces a hysteresis lag as shown in FIG. 3 in the output of the differential amplifier 2. The width of the hystersis lag is adjusted by varying the resistance value of the resistor 4. The output of the differential circuit 3 is connected to the base of a transistor 6, which is turned "ON" when the output of the differential circuit 3 is "HIGH". Upon the turning "ON" of the transistor 6, a relay 7 connected with its relay coil in series with the collector of the transistor 6 is turned "ON", and a relay contact 8 is closed. Upon the closing of the contact 8 a power supply 10 is connected to a refrigerator 9, and, thus, the refrigerator 9 is rendered operable to start a cooling operation. A comparator 11 for forming a duty cycle control compares a saw-tooth wave generated by a saw-tooth generating circuit 12 with a detected ambient temperature by an ambient temperature sensor 13, and the same is adapted such that the HIGH portion of its output will be prolonged if the ambient temperature rises. The output of the comparator 11 is applied through a diode 14 and a resistor 15 to the positive input terminal of the comparator 5 of the differential circuit 3, i.e., being connected with the resistance 4 at the point A.

Figure 4:
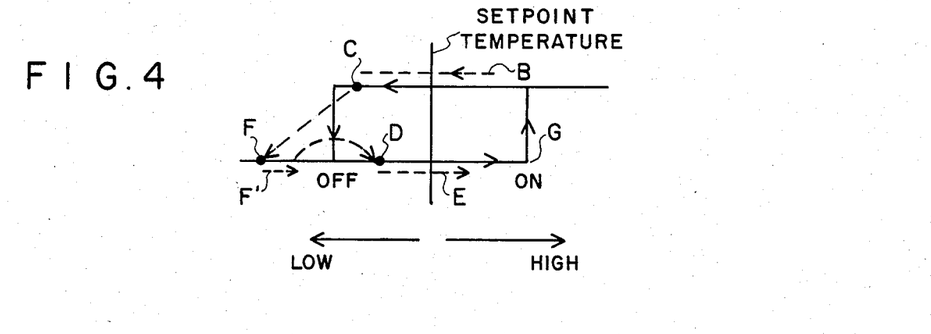
FIG. 4 is a graph showing the output characteristics of a comparator used in the apparatus shown in FIG. 2.

When the output of the comparator 11 is "HIGH", the potential on the cathode side of the diode 14 becomes high. As a result, the potential at the point A is separated from the comparator 11 and is determined by the output of the differential amplifier 2. Namely, the duty cycle operation is cut off, and the differential circuit 3 functions as a thermostat 1 and turns ON/OFF the transistor 6 by responding to the request for cooling. When, on the other hand, the output of the comparator is "LOW", the potential on the cathode side of the diode 14 is lowered to a negative voltage, whereby the potential at the point A is forced lower, because the resistance values of the resistors 4 and 15 have been selected so as to cause such an effect. Namely, when the output of the comparator 11 is "LOW", the output of the comparator 5 becomes the output of the differential circuit 3 and is forced "LOW". Such a behavior is shown in FIG. 4.

When the thermostat 1 is requesting cooling and the output of the comparator 11 is "HIGH", the transistor 6 is ON at the request of the thermostat 1, whereby the cooling operation is made and the cooled temperature descends along the line B. When the output of the comparator 11 is turned to "LOW" as the point C, the operating point of the thermostat 1 is shifted to the point F because of the potential drop at the point A by the turning to the LOW state. Consequently, the transistor 6 is turned "OFF", the cooling operation is stopped, and the temperature rises along the line $F^1$. When the output of the comparator 11 is then returned to "HIGH", the operating point will be shifted to the point D, and the temperature thereafter will rise along the line E. In the meantime, the cooling operation will not be restarted until the temperature reaches or exceeds the point G when the comparator 11 is in a HIGH state. In other words, the cooling operation will be held stopped when the output of the comparator is turned from "LOW" to "HIGH" if the temperature is below the point G.

This is a great distinction between the present invention and the prior art. More specifically, while the role played by the duty cycle of the prior art is merely to constitute an AND circuit, that of the duty cycle of the invention is to change the potential of the differential circuit thereby to shift the operating point of the same. Resultant effects of the present invention will be described below with reference to behavior of the controlled temperature shown in FIG. 5, wherein the solid line indicates the controlled temperature by the prior art and the dotted line indicates that by the present invention. The descending temperature with time indicates that the refrigerator 9 is in the operating condition, and the rising temperature with time indicates that the refrigerator 9 is in the stopped condition.

Figure 5:
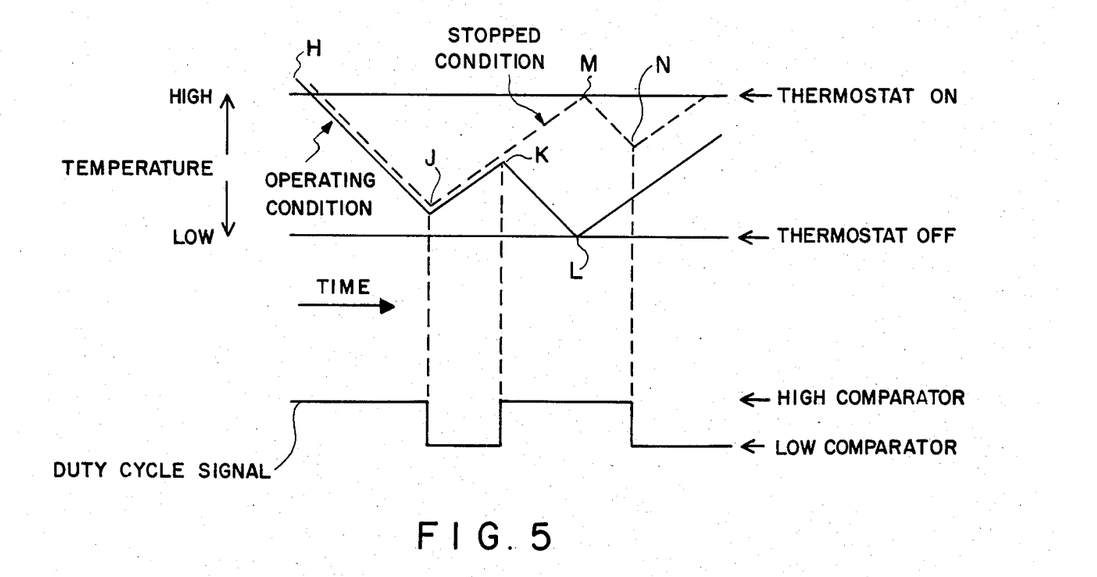
FIG. 5 is a graph showing the operating characteristics of the apparatus shown in FIG. 2.

The controlled temperature started from the point H is lowered by the refrigerator 9 which is put in an operating condition because the comparator 11 of the duty cycle is in a HIGH state, and the thermostat is making a request for cooling. The temperature reaches the point J where the comparator 11 is returned to "LOW". When the comparator 11 is returned to "LOW", the system of the present invention cause the refrigerator 9 to be stopped, and the temperature therefore starts to rise. For the sake of simplicity, the dead time is considered to be negligible here. After this point, the refrigerator 9 is restarted at the point K where the comparator 11 is turned to "HIGH" again, whereby the temperature descends until it reaches the point L, the minimum temperature being the thermostat OFF point, where the thermostat is turned OFF.

Since the role played by the duty cycle of the prior art is merely as an AND circuit as shown in FIG. 1 (a), the refrigerator 9 is held stopped without regard to whether the comparator 11 is "HIGH" or "LOW" until the thermostat ON point is reached. The refrigerator of the present invention behaves the same as that of the prior art at the point J, that is, the refrigerator 9 stops at this point upon a returning to "LOW" of the comparator 11, and the temperature starts to rise. However in the present invention the temperature rises to the point M since the refrigerator 9 is not restarted until the point where the comparator 11 is in a HIGH state, and the thermostat ON state is reached. At the point M, the refrigerator 9 is restarted, and the temperature starts to descend, but the refrigerator 9 is stopped and the temperature starts to rise again at the point N since the comparator 11 is turned to "LOW" again to cause the comparator 5 to return to "LOW" at that point.

As is apparent from a comparison of the operation of the present invention with that of the prior art, the refrigerator of the invention once stopped upon returning to "LOW" of the comparator 11 of the duty cycle will not restart its operation until the point is reached where the comparator 11 is "HIGH" and the thermostat is ON. Consequently, it rarely occurs that the temperature is lowered to the minimum temperature limit of the thermostat OFF point, and therefore the duration of the controlled temperature values can substantially be made smaller. In the event that the temperature has suddenly dropped below the thermostat OFF point for some reason or other, the cooling operation will be stopped even if the comparator 11 is in a HIGH state. In the control system of the present invention wherein a closed-loop system and a duty cycle control system for compensating for the ambient temperature are combined, the system is structured such that the operating point of the differential circuit of the thermostat will be modulated by a comparator for determing the duty factor of the duty cycle whereby the controlling characteristics are improved.

Figure 6:
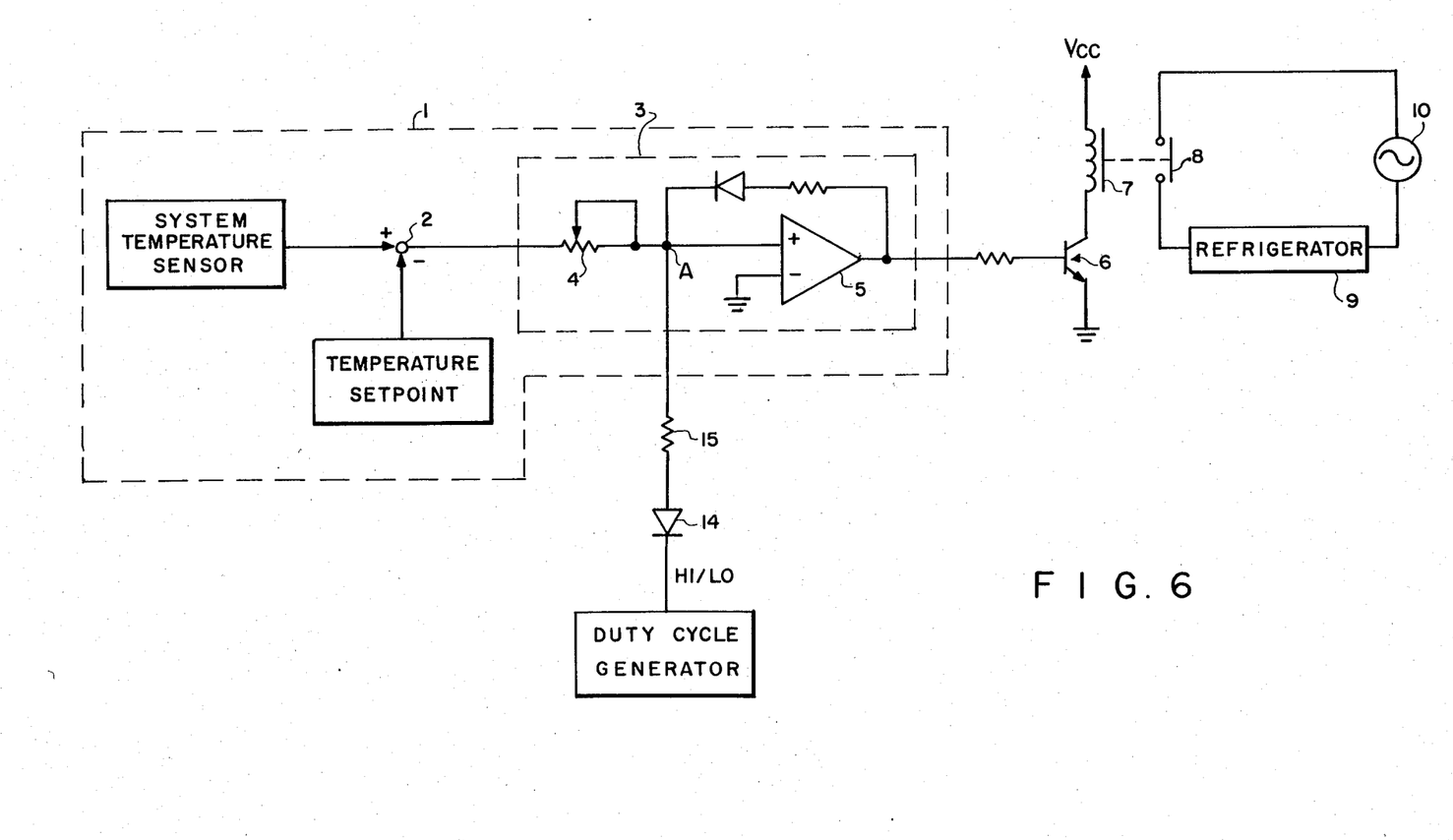
FIGS. 6, 7, and 8 are block diagrams each showing an alternate embodiment of the present invention.

While the embodiment of the invention shown in FIG. 2 is arranged so that the duty cycle is modulated with the ambient temperature, an alternate example as shown in FIG. 6 which has a fixed duty cycle generating circuit that can also attain the improved controlling characteristics by adapting the operating point of the differential circuit of the thermostat of the invention to be modulated by the duty cycle output.

Figure 7:
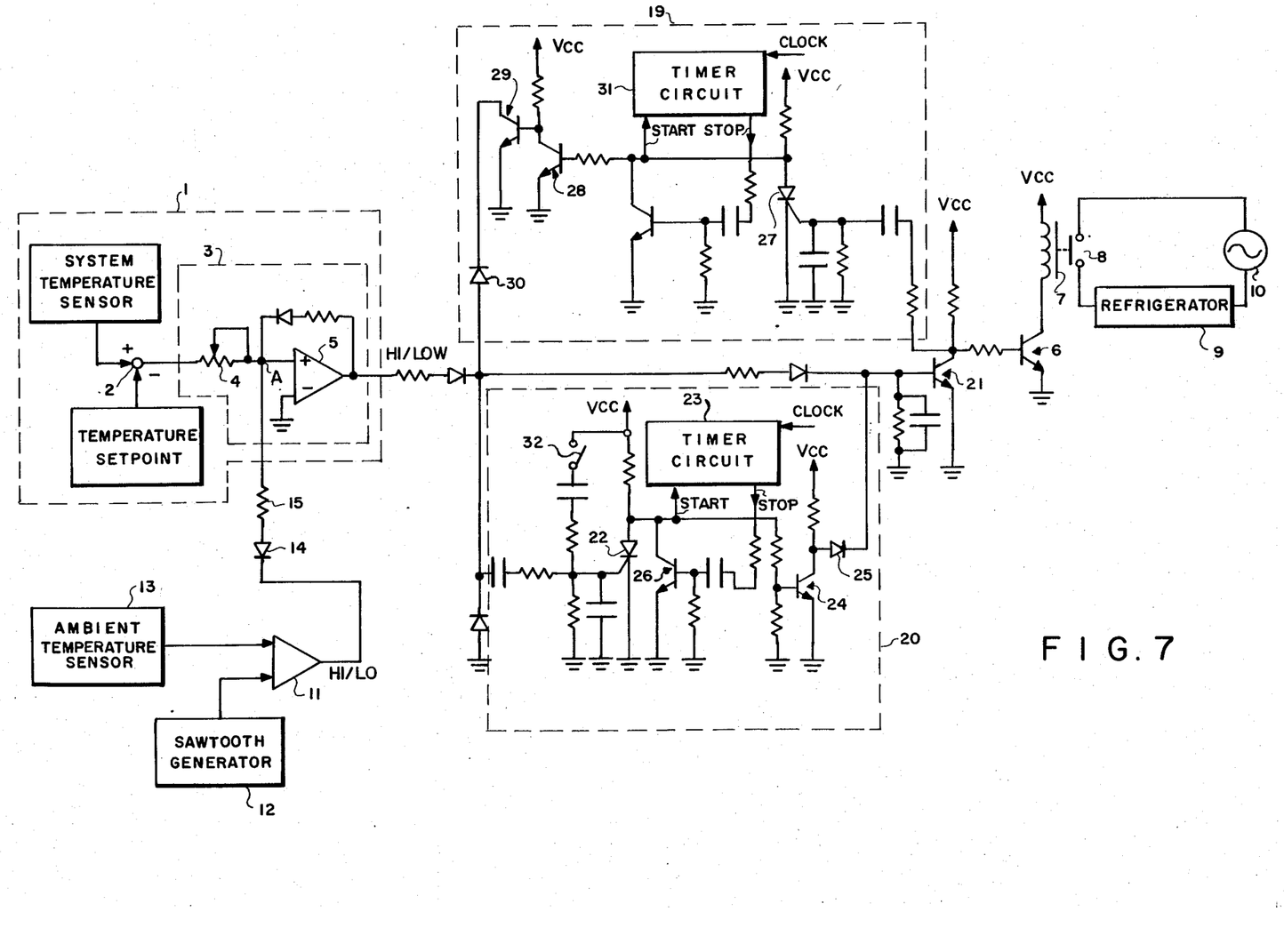

FIG. 7 shows another embodiment of the present invention. It is usually not preferable that the refrigerator 9 is alternately turned ON/OFF in a short period of time. In the embodiment shown in FIG. 7, the output of the differential circuit 3 is not directly applied to the transistor 6, but is connected through a minimum ON period setting circuit 20 for setting a minimum ON period for the refrigerator 9 and through a minimum OFF period setting circuit 19 for setting a minimum OFF period for the same, whereby it is arranged that the refrigerator 9 will not be alternately turned ON/OFF in a short period of time.

The operation of the embodiment shown in FIG. 7 will now be described by the following: The relay contact 8 in this embodiment is of a normally closed NC type while that of the embodiment shown in FIG. 2 was of a normally open NO type. Upon returning to "HIGH" of the ouptut of the differential circuit 3, the transistor 21 connected therewith is turned ON and the transistor 6 is turned OFF, whereupon the relay 7 is turned OFF to close the relay contact 8 to connect the power source 10 to the refrigerator 9 so that the refrigerator 9 starts its operation. Upon turning to "HIGH" of the output of the differential circuit 3, a thyristor 22 in the minimum ON period setting circuit 20 is also turned ON through a differentiating circuit, and the ON state is retained.

This ON signal serves as a starting signal for a minimum ON period timer circuit 23, and this timer circuit 23 is thereby rendered operable. The thyristor SCR 22 being ON causes a transistor 24 to be turned OFF, and a D.C. voltage $V_{cc}$ is thereby applied through a diode 25 to the base of the transistor 21. Therefore, unless the thyristor SCR 22 is reset and turned OFF, the transistor 21 will be held ON even if the output of the differential circuit 3 is returned to "LOW" again, and the operation of the refrigerator 9 will not be stopped. The resetting of the thyristor 22 is carried out by a stop signal to be provided by the minimum ON period timer circuit 23. The minimum ON period timer circuit 23, which started counting clock pulses when the output of the differential circuit 3 was returned to "HIGH", produces a "stop" signal when the counts reach a predetermined number. This "stop" signal is sent through a differentiating circuit to a transistor 26 to instantly turn ON the thyristor 26 whereby the thyristor 22 is turned OFF. After the thyristor 22 has been turned OFF, the ON/OFF state of the transistor 21 is determined only by the output of the differential circuit 3. In summary, by means of the minimum ON period setting circuit 20, the refrigerator 9 once started will not stop its operation and is forced to continue its operation during the period of time preset by the minimum ON period timer circuit 23 even if a stopping instruction is given by the differential circuit 3.

Likewise, upon returning from "HIGH" to "LOW" of the output of the differential circuit 3, namely, upon returning from ON to OFF of the transistor 21, a thyristor 27 of the minimum OFF period setting circuit 19 is turned and held ON. A transistor 28 is thereby turned OFF and a transistor 29 is turned ON. Now, even if the output of the differential circuit 3 is returned to a HIGH state again, the transistor 21 will not be turned ON since the voltage of the above output is to be grounded through a diode 30 and the transistor 29 which then is held ON. The resetting of the thyristor 27 is, similarly to the earlier case, carried out by a "stop" signal output from a minimum OFF period timer circuit 31 after a predetermined period of time has elapsed. In summary, by means of the minimum OFF period setting circuit 19, the refrigerator 9 once stopped will not restart operation and is forced to continue to be stopoped during the period of time preset by the minimum OFF period timer circuit 31 even if an operating instruction is given by the differential circuit 3.

A switch 32 provided in the minimum ON period setting circuit 20 is for ensuring that the refrigerator 9 will be rendered operable always to begin with an ON condition at the time power is supplied to the apparatus. Namely, if the switch 32 is closed, then the thyristor 22 is turned ON by means of a differentiating circuit, whereby the refrigerator 9 is kept in operation without being stopped during the minimum period of time set by the minimum ON period timer circuit 23, and a safety of the operation at the startup is thereby ensured.

If, conversely, the switch 32 is open at the time power is supplied, it is ensured that the refrigerator will be rendered operable always to begin with an OFF condition. That is, the thyristor 22 will not be turned ON, but the thyristor 27 will be turned ON, and therefore the refrigerator 9 will not start operation before the minimum period of time set by the minimum OFF period timer circuit 31 elapses. It is thus made possible to select either an ON start mode or an OFF start mode at the time power is supplied.

Figure 8:
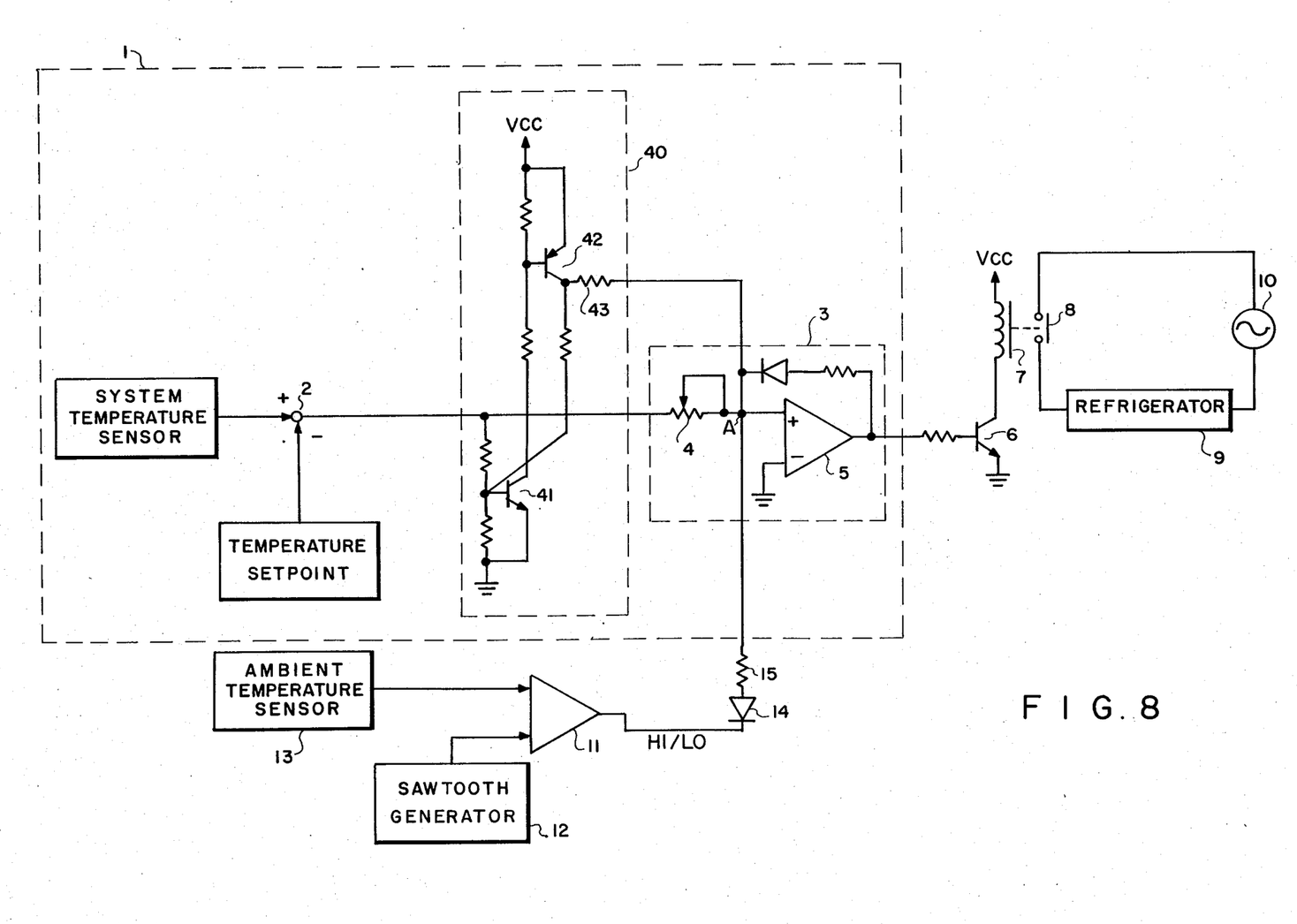

FIG. 8 shows another embodiment of the present invention. Since the temperature within the refrigerator system may be high at the starting up of the refrigerator 9, it is desired that the refrigerator 9 will in the beginning be continuously operated by only use of closed-loop control with the thermostat, without use of duty cycle control, so that the temperature will be brought down closer to the preset temperature as soon as possible. Subsequently, the duty cycle control is added when the temperature of the system has come in the vicinity of the preset setpoint value in order to improve the controlling characteristics. The embodiment shown in FIG. 8 provides such an operation wherein the duty cycle control is adapted to be canceled while the temperature within the refrigerator system is higher than the preset temperature by a predetermined value, and the closed-loop control is adapted to be used only during that period.

Referring to FIG. 8, the differential amplifier 2 responding to the difference between the detected temperature value and the preset temperature value is connected through a resistor to the base of a transistor 41 of a thermostat duty cencel circuit 40. Since the emitter of the transistor 41 is set at the zero volt potential, the transistor 41 is set at the zero volt potential, the transistor 41 is turned ON when the output of the differential emplifier 2 reaches or exceeds about 0.6 V which is the base-emitter ON voltage, and a transistor $Q_8$ 42 is thereby turned ON. That is, when the temperature within the refrigerator system becomes higher than the preset temperature by a predetermined temperature value, the transistor 42 is turned ON, and the point A of the differential circuit 3 is connected with the power source voltage $V_{cc}$ through a resistor 43.

When the output of the comparator 11 for generating the duty cycle is "HIGH", the cathode side of the diode 14 is, as in the embodiment of FIG. 2, rendered to be at a high potential, and therefore the potential at the point A is cut off from the comparator 11 and is determined only by the output of the differential amplifier 2. Consequently, the comparator 5 is returned to "HIGH" at the request for cooling and the transistor 6 is thereby turned ON so that the cooling operation will be made. On the other hand, when the output of the comparator 11 is at "LOW", the cathode side of the diode 14 is lowered to a negative voltage, and therefore the potential at the point A tends to be forced lower. However, since the power source voltage $V_{cc}$ applied to the point A through the resistor 43 prevents the potential drop at the point A, the potential at the point A is kept at a positive value. Thus, the comparator 5 is held at "HIGH" to keep the transistor 6 ON, so that the cooling operation is continued.

As described above, such an operation is made possible to adapt the duty cycle control to be cut off by causing the potential at the point A to be kept positive by means of the thermostat duty cancel circuit 40 which is rendered operable when the temperature within the refrigerator system is higher than a preset temperature by a predetermined temperature value. When the temperature within the refrigerator system has approached the preset temperature, the thermostat duty cancel circuit 30 is rendered inoperable, and the closed-loop control and the duty cycle control are used in combination, the same as in the embodiment shown in FIG. 2, for an improvement of the controlling characteristics. The feedback connection made from the collector of the transistor 42 to the base of the transistor 41 is arranged to introduce a hysteresis lag in the operation of the thermostat duty cancel circuit 40, whereby chattering of the relay 7 during ON/OFF operations of the thermostat duty cancel circuit 40 is prevented. While in the description of the embodiments discussed in the foregoing, only a refrigerator 9 has been shown as the object of control, it should be noted that the present invention is not limited to a cooling system application, and it is applicable also to controlling other environment variables, e.g., a heating system.

Accordingly, it may be seen that there has been provided, in accordance with the present invention, an improved control system having combined closed loop and duty cycle control functions.

The embodiments of the present invention in which an exclusive property or privilege is claimed are defined as follows:

1. A control system comprising
   a differential amplifier for amplifying the difference between a preset reference temperature for a controlled system and a detected temperature in the controlled system,
   thermostat means having a differential circuit for providing a predetermined hysteresis lag for an output of said amplifier, and
   a duty cycle generating circuit for changing the operating potential of said differential circuit in accordance with a predetermined duty cycle thereby to shift the operating point thereof wherein said duty cycle generating circuit includes a comparator for comparing output of a saw-tooth generating circuit and the output of an ambient temperature sensor for providing an output corresponding to the difference therebetween.

2. A control system as set forth in claim 1, and including a minimum ON period setting circuit for providing an output for causing the controlled system to continue its operation for a preset period of time after said differential circuit has instructed the controlled system to start its operation and a minimum OFF period setting circuit for providing an output for causing the controlled system to keep its operation stopped for a predetermined period of time after said differential circuit has instructed the controlled system to stop its operation.

3. A control system as set forth in claim 2, wherein said minimum ON period setting circuit includes switch means for ensuring either ON or OFF operation of the controlled systems at the time power is turned on.

4. A control system as set forth in claim 1, and including a thermostat duty cancel circuit for canceling duty cycle operation of said thermostat means when the difference between said detected temperature and said preset temperature is larger than a predetermined value.

* * * * *